(12) United States Patent  
Zinevich

(10) Patent No.: US 8,458,759 B2
(45) Date of Patent: Jun. 4, 2013

(54) METHOD AND APPARATUS FOR LOCATING NETWORK IMPAIRMENTS

(75) Inventor: Victor M. Zinevich, Voronezh (RU)

(73) Assignee: Arcom Digital, LLC, Syracuse, NY (US)

( * ) Notice: Subject to any disclaimer, the term of this patent is extended or adjusted under 35 U.S.C. 154(b) by 689 days.

(21) Appl. No.: 12/214,399

(22) Filed: Jun. 18, 2008

(65) Prior Publication Data
US 2008/0320541 A1 Dec. 25, 2008

Related U.S. Application Data

(60) Provisional application No. 60/945,094, filed on Jun. 19, 2007.

(51) Int. Cl.
*H04N 7/173* (2006.01)

(52) U.S. Cl.
USPC ........... 725/125; 725/121; 725/124; 725/148; 725/149

(58) Field of Classification Search
USPC .................................................. 725/124, 125
See application file for complete search history.

(56) References Cited

U.S. PATENT DOCUMENTS

| | | | |
|---|---|---|---|
| 2,805,399 A | 9/1957 | Leeper | |
| 5,281,933 A | 1/1994 | Chamberlin | |
| 5,505,636 A | 4/1996 | Blum | |
| 5,608,428 A * | 3/1997 | Bush | 725/149 |
| 5,990,687 A | 11/1999 | Williams | |
| 6,018,358 A * | 1/2000 | Bush | 725/125 |
| 6,292,944 B1 | 9/2001 | Harris | |
| 6,362,709 B1 | 3/2002 | Paxman et al. | |
| 6,600,515 B2 | 7/2003 | Bowyer et al. | |
| 6,772,437 B1 * | 8/2004 | Cooper et al. | 725/111 |

(Continued)

FOREIGN PATENT DOCUMENTS

| | | |
|---|---|---|
| JP | 2005-123870 A1 | 5/2005 |
| WO | WO 0013424 A1 | 3/2000 |
| WO | WO 0106337 A1 | 1/2001 |
| WO | WO 2006091708 A2 | 8/2006 |

OTHER PUBLICATIONS

European Patent Office, Int'l. Preliminary Report on Patentability/Written Opinion of the International Searching Authority for PCT counterpart appl'n. to subject U.S. Appl. No. 12/214,399, Dec. 22, 2009, pp. 1-8, Geneva, Switzerland/Munich, Germany.

(Continued)

*Primary Examiner* — Robert Hance
(74) *Attorney, Agent, or Firm* — Lawrence P. Trapani, Esq.

(57) ABSTRACT

A system for locating an impairment in a coaxial cable network comprises an encoder, an impairment detector, and a decoder. The encoder couples to the network at a predetermined encoding point, upstream of the impairment. The encoder automatically encodes an identification code on a signal originating downstream of the encoding point and associated with the impairment. The impairment detector couples to the network at an access point, upstream from the encoding point, and receives signals from the network. The detector is adapted to detect from the received signals the signal associated with the impairment and generate a detected version of the signal. The decoder is adapted to decode the identification code from the detected version of the impairment signal. Once the identification code is determined, the encoder and encoding point are identified, and the location of the impairment is determine to be downstream of the encoding point.

21 Claims, 14 Drawing Sheets

U.S. PATENT DOCUMENTS

| | | | |
|---|---|---|---|
| 6,804,826 B1 | 10/2004 | Bush et al. | |
| 6,880,170 B1 | 4/2005 | Kauffman et al. | |
| 7,415,367 B2 * | 8/2008 | Williams | 702/59 |
| 2002/0144292 A1 | 10/2002 | Uemura et al. | |
| 2004/0172664 A1 | 9/2004 | Rocci et al. | |
| 2006/0271986 A1 * | 11/2006 | Vogel | 725/111 |
| 2007/0169162 A1 * | 7/2007 | Kola | 725/117 |
| 2007/0288982 A1 | 12/2007 | Donahue | |

OTHER PUBLICATIONS

European Patent Office, International Search Report for PCT counterpart appl'n. to subject U.S. Appl. No. 12/214,399, Dec. 8, 2008, pp. 1-4, Munich, Germany.

English Translation of Office Action in Japanese application 2010-513243, which is a counterpart to the subject application, dated May 22, 2012, pp. 1-3.

* cited by examiner

METHOD AND APPARATUS FOR LOCATING NETWORK IMPAIRMENTS

CROSS-REFERENCE TO RELATED APPLICATIONS

This application claims the benefit of U.S. Provisional Application No. 60/945,094, filed Jun. 19, 2007.

BACKGROUND OF THE INVENTION

The present invention relates generally to network monitoring systems, and more particularly to methods and apparatus for locating impairments in a hybrid fiber-coax (HFC) network.

Two categories of impairments regularly present themselves within HFC networks. They are (1) common path distortion (CPD), and (2) noise. Sources of noise may be internal to the network or external to the network. The latter is called "ingress". Transmission difficulties of voice and data traffic over the return path band in an HFC network, due to CPD and/or noise, are well known and have been well documented in the past ten to fifteen years. Over time, in order to meet the increasing demands of more traffic on their networks, operators have moved to higher throughput formats for return transmission from home, e.g., 16 QAM. These higher order modulation signals are inherently more sensitive to CPD as well as noise. Error correction and other schemes have been implemented to minimize this sensitivity, however the problem still exists. Excessive CPD and noise in the return path can cause disruption to services such as voice and data. As such, it is important and of value to the operator of such networks to be able to quickly locate sources of these impairments such that the problem can be repaired and customer disruption can be minimized.

There are several strategies employed by operators in an attempt to manage return path impairments on the network as well as methods used to try to find and fix problems when they occur.

With the goal of managing ingress, some operators choose to install devices such as passive filters (high pass filters, window filters, or step attenuator filters) that reduce ingress coming from the subscriber's home. Another approach is to install Dynamic Ingress Blocking (DIB) systems that attenuate all or portion of the return path signals during periods of idle traffic and allow all signals through when traffic is present. This latter approach effectively blocks ingress when no traffic is present and allows it to enter the network when traffic is present. It must be noted that these approaches are not completely effective and they do not attempt to locate or eliminate sources of noise and ingress. Many operators alternatively choose not to use any noise mitigating devices.

In order to find and fix problems, many operators have installed return path spectrum analysis monitoring systems. When a noise or ingress problem is measured at the headend, a typical process is for a technician to go into the field and troubleshoot directly by temporarily disconnecting a portion of the return plant while simultaneously monitoring the effect this has at the headend. If ingress or other noise decreases at the headend when a return leg is pulled, a conclusion can be made that this was the direction in which the ingress or other noise was coming from. This trial and error process continues until the source of noise or ingress is found, which can be extremely time consuming.

Other employed systems include the Hunter® System by Arcom Digital, LLC, Syracuse, N.Y., described in U.S. Published Application No. US 2006/0248564 A1, published on Nov. 2, 2006, or one described in U.S. Published Application No. US 2004/0245995 A1, published on Dec. 9, 2004. These systems use passive detection techniques and correlation processing to compare simulated CPD signals generated from forward path signals at the headend to signals measured from the return path. These systems can pinpoint sources of CPD in an HFC network by calculating the distance to the source from a time delay determined from the correlation processing. However, due to inherent inaccuracies of network maps utilized in the cable television industry, further efforts to locate the source are often required. These additional efforts can be time consuming.

When an impairment is measured at the headend, the network operator can use a variety of methods in an attempt to find the cause of the problem. In a typical node on an HFC network, there are many branches and hundreds of devices, each of which could be the cause of the problem. Localizing the source of the problem can be a time consuming endeavor. Some cable systems utilize low attenuation value switches (termed "wink" switches) that attenuate ingress and other noise signals in various portions of the plant to assist the user in localizing the source of noise and ingress. Each wink switch has a unique address, and the various switches within the node are sequentially addressed and turned on such that a few dB of additional attenuation is introduced onto the return path of the leg of the network where the switch is attached. The return path spectrum at the headend is monitored while this switching is occurring—thereby pointing to a particular leg if the timing of when a switch is turned on corresponds to a noise level drop by a corresponding amount at the headend. Another technique employs a field spectrum analyzer in an attempt to troubleshoot the source. Other system operators use dipole antennas installed on trucks that are driven around the system in an attempt to triangulate a source. Others may use the previously mentioned Hunter® System.

The methods described above have deficiencies. In either the DIB or wink switch approach, it is necessary to introduce additional carriers transporting data over the return path in order to address the devices. In addition, the addressable devices installed in the field are complicated and relatively expensive. In the case of the DIB approach, it is required that additional devices be installed in the cable network. This is an expensive procedure that requires system downtime and service interruption. These additional devices also become potential new sources of network problems. The power consumption of such devices can make them unusable in some applications, or could necessitate relocation or adding power supplies to the network. In the case of wink switches, they are only installed in certain active devices; thus, the number of such switches may be limited in the network. Finally, in the case of wink switches, the amount of attenuation of the switch (typically 3 or 6 dB) could be disruptive to network traffic.

In this specification, the term "encoder," "encoder device," "ID encoder" or "probe" refers to a device that is installed in the cable network at an appropriate location, and which imparts or encodes an ID code, e.g., a frequency division or code division ID (as further described below), on the signal traffic in the network, so that the location of the device and of any impairments originating downstream from the device can be determined. The device is also sometimes referred to as a "marker" or "marker device" because it can be installed to mark or flag the network leg or branch from which the impairment originates.

OBJECTS AND SUMMARY OF THE INVENTION

It is therefore an object of the present invention to provide methods and apparatus for locating impairments in HFC cable networks that overcomes the problems associated with the prior art.

It is another object of the present invention to provide methods and apparatus for locating network impairments more accurately and reliably than previous methods and apparatus.

It is a further object of the present invention to provide methods and apparatus for locating network impairments that do not require the transmission of additional signals in the return path frequency band.

It is a still another object of the present invention to provide methods and apparatus for locating network impairments that do not require addressable devices deployed in the network.

It is still a further object of the present invention to provide methods and apparatus for locating network impairments that include encoder or marker devices deployed in the network that are easy to install, and the installation does not require the disconnection of the network or disruption in service to subscribers.

It is yet another object of the present invention to provide methods and apparatus for locating network impairments that include encoder or marker devices that are of relatively simple design and low cost.

It is yet a further object of the present invention to provide methods and apparatus for locating network impairments that include encoder or marker devices, the operation of which do not disrupt or interfere with service in either the forward or return paths of the network.

These and other objects are attained in accordance with the present invention wherein there is provided a system of locating impairments in an HFC network, comprising: (a) a network impairment detector that determines whether an impairment, such as ingress or CPD, is present in the network; (b) at least one encoder or marker device deployed in the network at a known encoding point, which encodes return path signals (including signals generated by impairments) originating downstream of the encoding point with an ID code; and (c) a decoder unit that decodes the ID code and identifies the encoder and the encoding point (i.e., the encoder's location), whereby it is determined that any network impairments detected by the impairment detector are downstream of the encoding point.

In the preferred embodiment, the encoder or marker device is in the form of a threaded probe that screws into an access port (or seizure port) of a splitter, multi-tap, amplifier or other passive or active network device already installed in the network. The probe makes contact with a seizure screw in the device. Thus, the preferred method of installation does not require any cutting of cables or disruption of service. The preferred method of encoding is amplitude modulation (AM) of the return signals with a single frequency, periodic function. In this case, the decoder unit is an amplitude demodulator. In the preferred embodiment, the decoder unit is combined with the impairment detection unit.

Methods of locating impairments in an HFC network are also contemplated by the present invention. One such method comprises the steps of: (a) placing an ID encoder at an encoding point in the network, wherein the network has forward and return path frequency bands; (b) placing a network impairment detector and an ID decoder at a test point in the network, upstream from the encoding point; (c) imparting an ID code from the encoder on signals in at least a portion of the return path frequency band, which signals originate downstream from the encoding point; (d) receiving the encoded signals at the test point; (e) determining whether an impairment is detected from the encoded signals, in the network impairment detector; and (f) decoding the ID code with the ID decoder to identify the ID encoder and the encoding point in the network, whereby any impairment detected in the previous step is determined to be downstream of the encoding point.

BRIEF DESCRIPTION OF THE DRAWING

Further objects of the present invention will become apparent from the following description of the preferred embodiment with reference to the accompanying drawing, in which.

DETAILED DESCRIPTION OF THE PREFERRED EMBODIMENT

Figure 1:
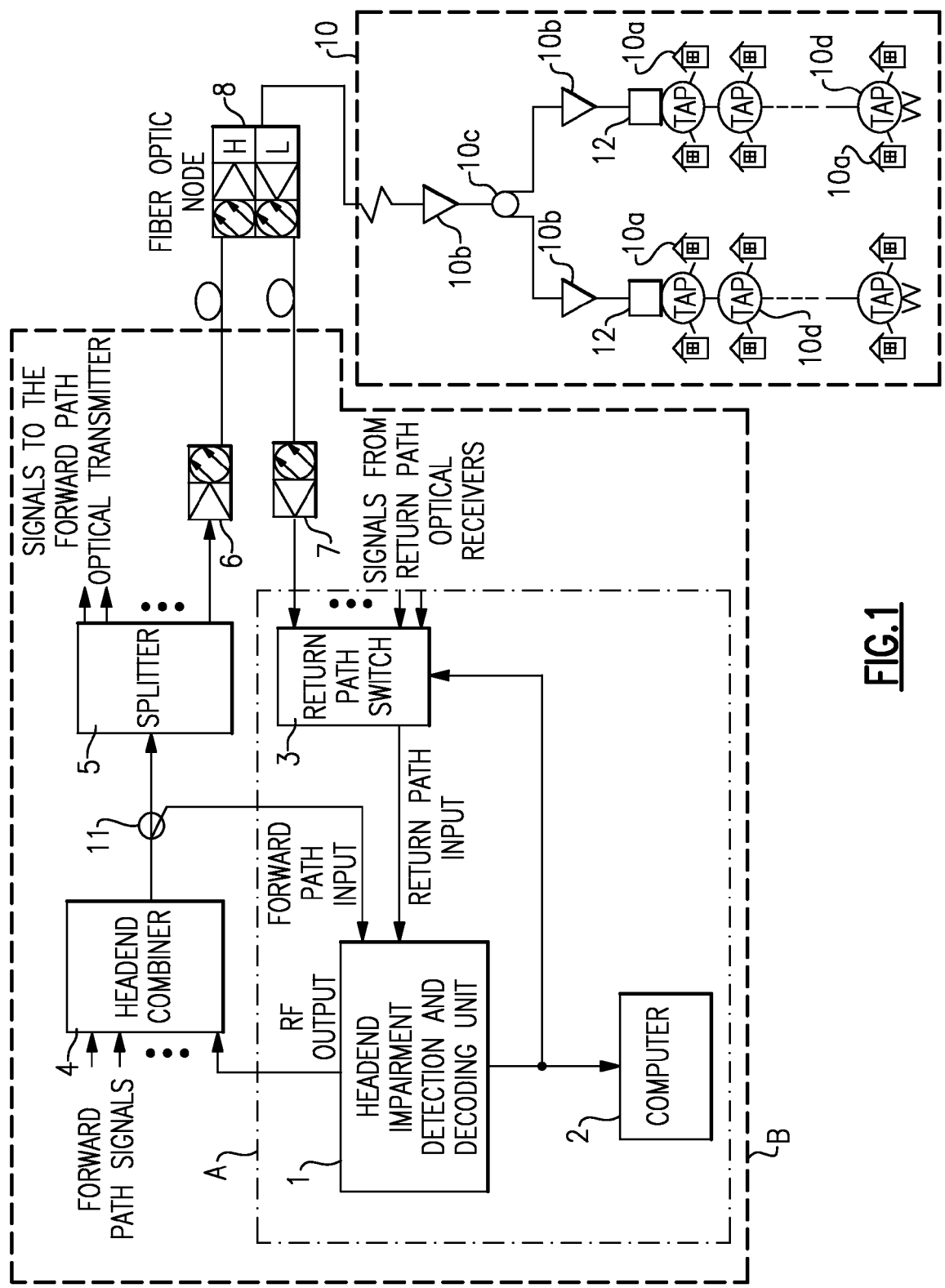
FIG. 1 is a block diagram of a system of the present invention for locating impairments in an HFC CATV network.

FIG. 1 shows a block diagram of one embodiment of an impairment location system A of the present invention. System A is incorporated into a CATV headend B and a coaxial cable portion 10 of an HFC cable TV network. System A includes the following equipment connected at the headend: a headend impairment detection and decoding unit 1, a return path switch 3, and a computer 2. System A also includes at least one ID encoder 12 connected to or integrated in coaxial cable portion 10 of the HFC network. The general headend equipment includes a headend combiner 4 for combining forward path signals (i.e., analog and digital TV program signals), a signal splitter 5 for delivering the forward path signals to a plurality of optical nodes, a plurality of optical transmitters 6 for transmitting the forward path signals to fiber optic nodes in the fiber optic portion of the HFC network, and a plurality of optical receivers 7 for receiving return path signals from the optical nodes and delivering them to headend receivers (not shown).

Headend impairment detection and decoding unit 1 has two inputs: one is connected to an output of return path switch 3, and the other is connected to an output of combiner 4, through a tap 11. An output ("RF OUTPUT") of unit 1 is connected to an input of combiner 4. The analog and digital TV program signals of the forward path are applied to the other inputs of combiner 4. The combined output of combiner 4 is connected to an input of splitter 5. The outputs of splitter 5 are connected to the inputs of optical transmitters 6. The forward path signals are transmitted from transmitters 6 over optical cables to corresponding optical nodes 8, as shown in FIG. 1. As previously indicated, the output of combiner 4 is also coupled through tap 11 to an input of unit 1 (i.e., the "Forward Path Input").

Management of unit 1 and switch 3 is carried out with the help of computer 2. As shown in FIG. 1, computer 2 is connected to unit 1 and switch 3. Computer 2 is programmed to control switch 3 and cause switch 3 to connect the return path signals from each optical receiver 7 to another input of unit 1 (i.e., the "Return Path Input"), separately, in a cyclic or programmed (or selective) manner. In addition, computer 2 performs processing and storage of information received from unit 1.

With further reference to FIG. 1, the output of optical nodes 8 are connected to a coaxial cable plant 10 of the network. Nodes 8 convert the forward path optical signals to RF signals for transmission down coaxial cable plant 10 and convert the RF return path signals to the optical spectrum for transmission to optical receivers 7. Coaxial cable plant 10 is generally arranged in a tree-and-branch pattern, between nodes 8 and a multiplicity of subscribers' homes 10a. Only a portion of the tree-and-branch structure of plant 10 is shown in FIG. 1. However, what is shown is representative of the entire network plant. As shown there are distribution amplifiers 10b, splitters 10c, and multi-taps 10d.

In accordance with the invention, ID encoders 12 are placed at encoding points in coaxial cable plant 10. Ideally, encoders 12 should be placed in each terminal branch of plant 10. However, this may not be possible due to the power requirements of encoder 12, which will be explained further below. Encoder 12 is preferably in the form of a probe that is configured to be threaded into an access port of a system passive device, such as a splitter or multi-tap. The probe embodiment will be described in greater detail below. Encoder 12 can also be incorporated inside a system passive device as part of its circuitry.

Figure 2:
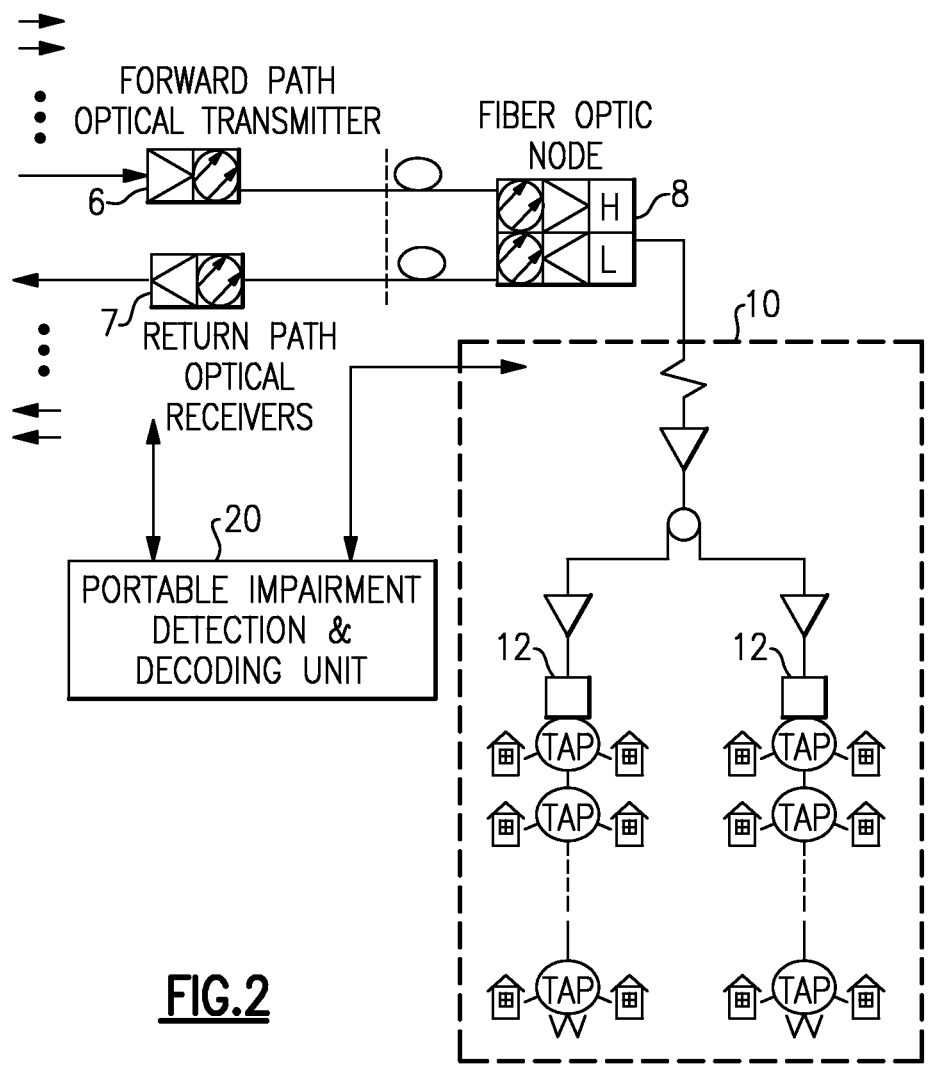
FIG. 2 is a block diagram of a portable system of the present invention for locating impairments in an HFC CATV network.

As shown in FIG. 2, impairment detection and decoding unit 1 may be implemented as a portable or handheld unit 20. This is the preferred form for the impairment detection and decoding unit of the present invention. As illustrated in FIG. 2, unit 20 can be connected to an RF test point in headend return path optical receiver 7 or at any test point (or other access point) in coaxial cable plant 10, upstream of encoders 12.

Figure 3:
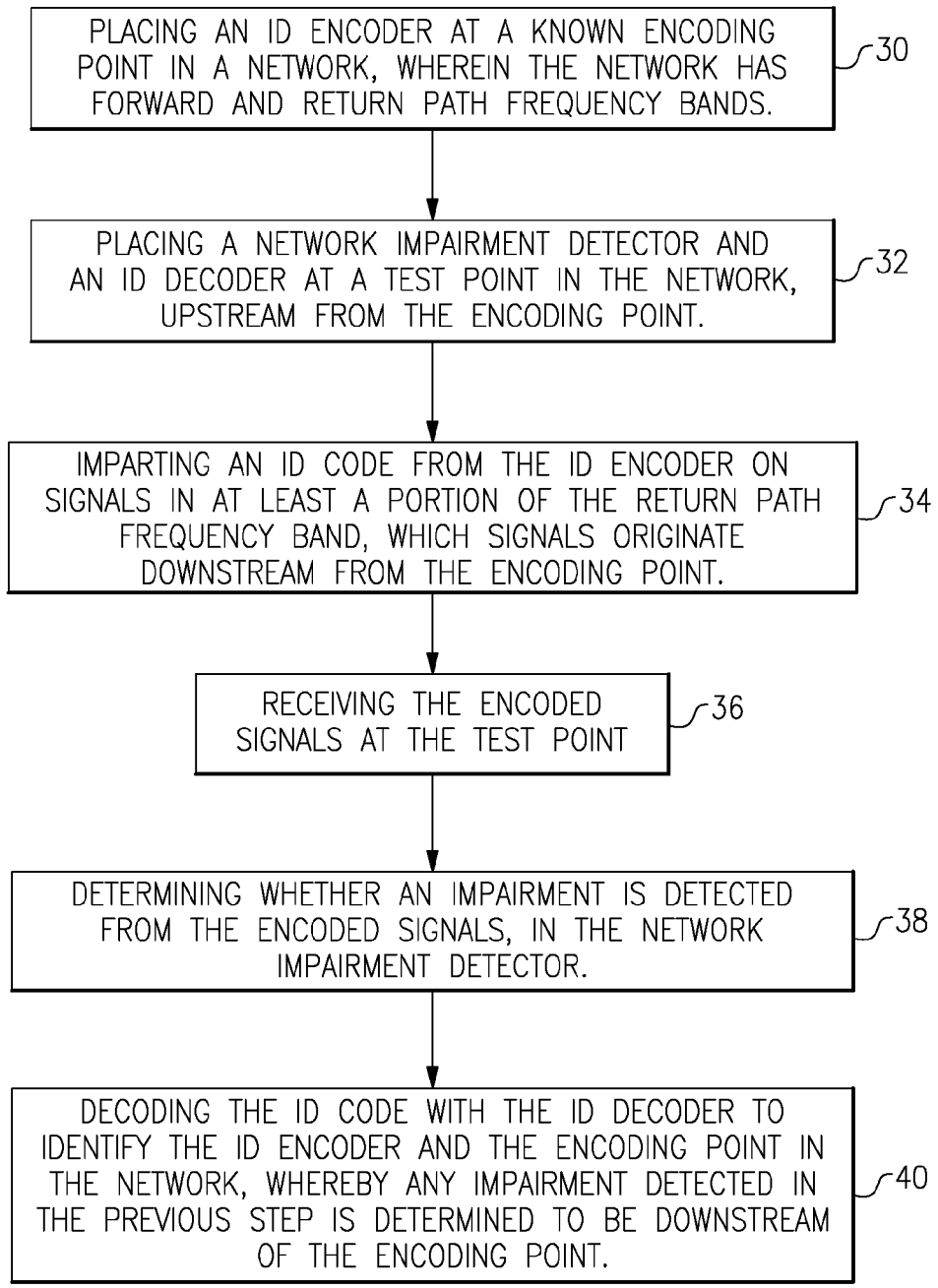
FIG. 3 is flow diagram illustrating the preferred steps of carrying out the invention.

The general steps of the preferred method of carrying out the invention are shown in FIG. 3. In a first step 30, at least one ID encoder 12 is placed or installed at an encoding point in coaxial plant 10. The encoding point is preferably at the head of a branch in the plant, as shown in FIG. 1. A second step 32 includes placement or connection of impairment detection and decoding unit 20 at any test point at the headend or in coaxial plant 10, as shown in FIG. 2. A third step 34 involves imparting an ID code from encoder 12 on signals (which includes noise) originating downstream of the encoding point, in at least a portion of the return path frequency band. The ID code is preferably in the form of amplitude modulation with the frequency of modulation being the identifying code. A fourth step 36 includes receiving the encoded signals at the test point. A fifth step 38 includes determining whether an impairment is detected from the encoded signals using unit 20. The impairments to be detected may by common path distortion (CPD), noise and ingress. A sixth step 40 includes decoding the ID code using unit 20 to identify ID encoder 12 and its encoding point in coaxial plant 10. The decoding portion of unit 20 is an amplitude demodulator if the ID code is implemented as amplitude modulation. The decoding function is preferably implemented in a digital signal processor (DSP) chip or in software on a special or general purpose computer (See FIGS. 11 and 12).

Figure 4:
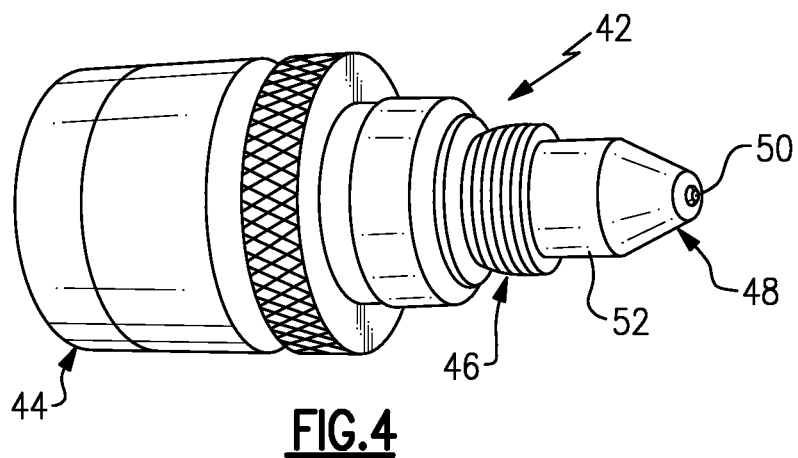
FIG. 4 is a perspective view of an encoder probe of the present invention.
Figure 5:
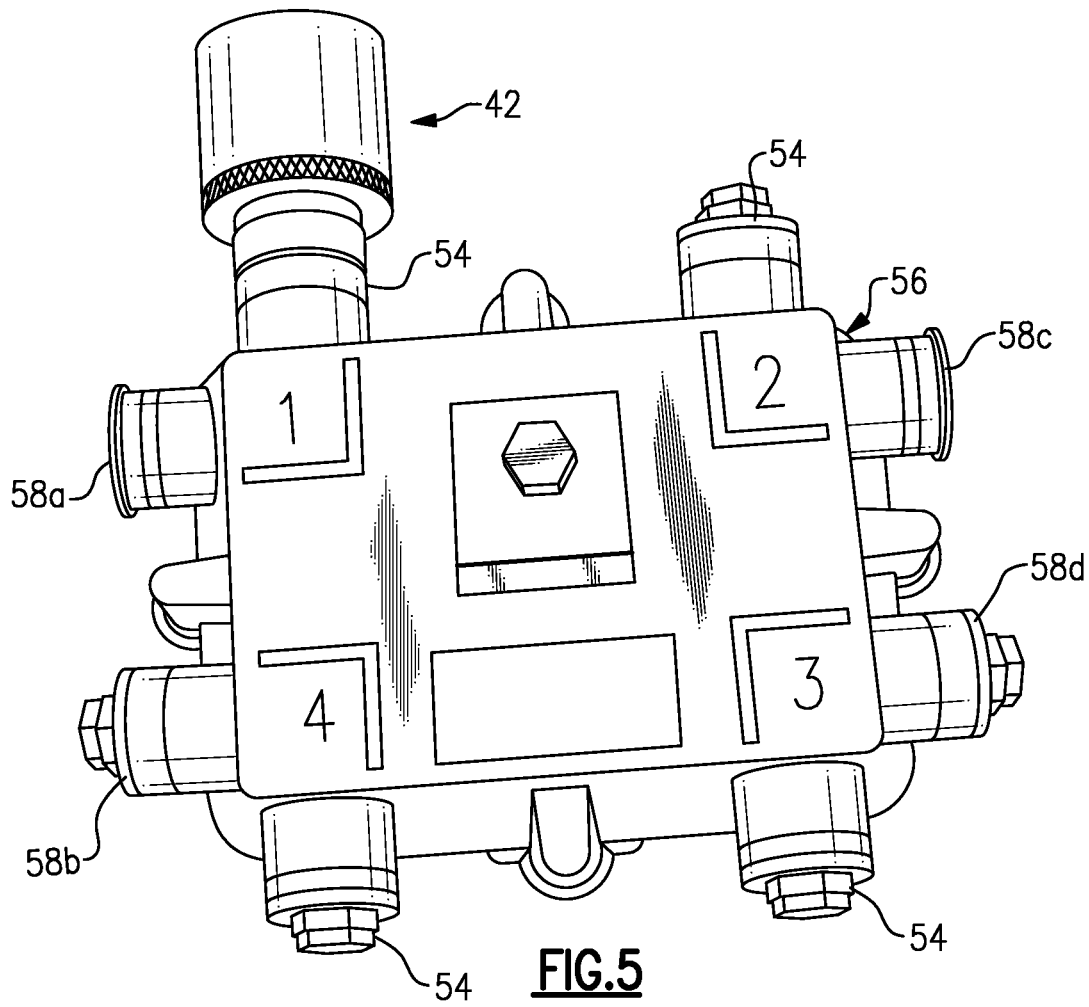
FIG. 5 is a perspective view of the encoder probe threaded onto an access port of a line splitter, to illustrate the ease of installation of the probe into the coaxial portion of the network plant.

As indicated before, ID encoders 12 are preferably configured in the form of a probe. In FIG. 4, a probe 42 constructed in accordance with the present invention is shown. Probe 42 comprises a generally cylindrical housing 44, including a threaded connector 46, and a probe tip 48. Probe tip 48 includes a metal seizure contact 50 and an insulator assembly 52. As shown in FIG. 5, probe 42 is threaded into an access port 54 of a splitter 56. Splitter 56 is shown as an example only. Probe 42 can be connected to any type of passive or active device having an unused seizure or access port where contact to one of the device's seizure screws can be made. Splitter 56 includes cable ports 58a-d. FIG. 5 illustrates the simplicity of installation of probe 42 into network plant 10. When probe 42 is fully threaded into access port 54, metal contact 50 makes direct contact with the seizure screw inside splitter 56.

Figure 6A:
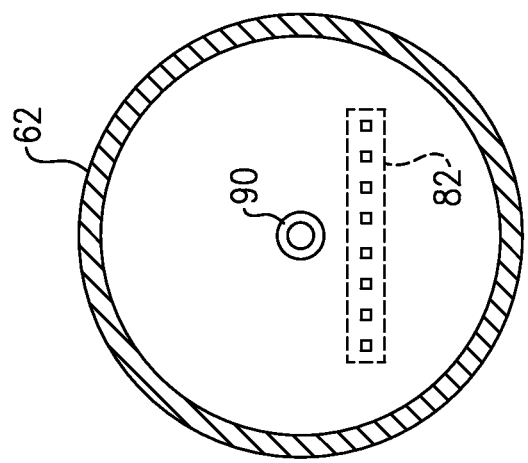
FIG. 6A is cross sectional view taken along line A-A' in FIG. 6.
Figure 6:
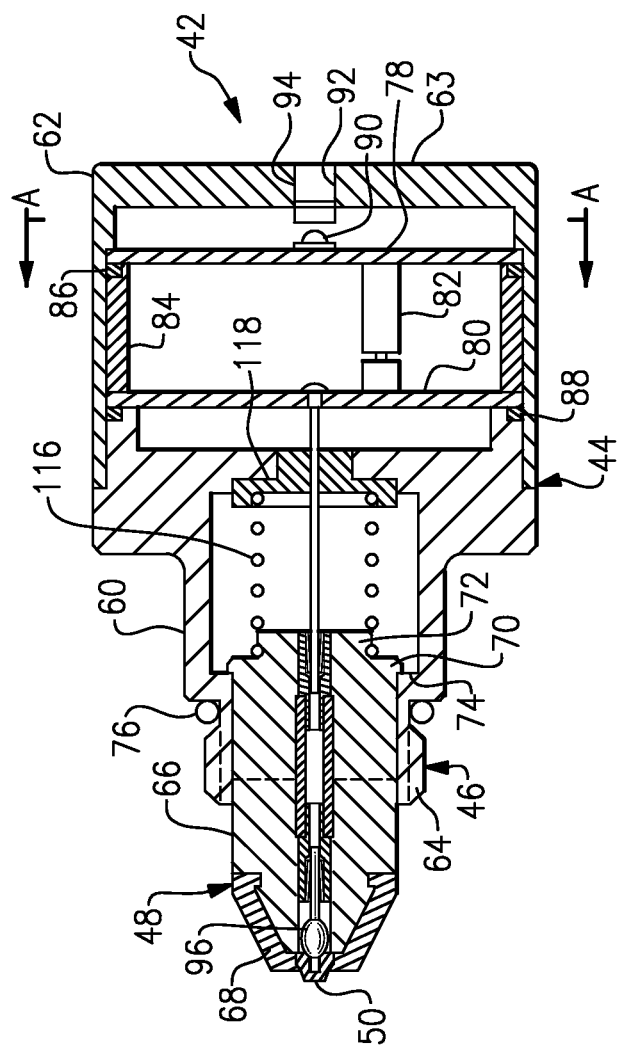
FIG. 6 is a lateral cross sectional view of the probe, illustrating its construction.

The construction of probe 42 is shown in FIGS. 6 and 6A. Housing 44 includes a body 60 and an end cap 62, both made of nickel-plated brass or similar conductive metal typically used for CATV trap filter housings. Threaded connector 46 extends from body 60 and contains external threads 64 which are configured and dimensioned to thread into a seizure or access port on a network device. Insulator assembly 52 includes a generally cylindrical insulator body 66 and a cone-shaped insulator cap 68, both made of polypropylene. Insulator body 66 includes a generally circular rear flange 70 and a cylindrical tail section 72. Probe tip 48 is inserted into connector 46. Flange 70 is compressed during insertion and acts as a stop against a shoulder 74 of probe body 60 (further described below). Four longitudinal grooves are contained on the outer surface of insulator body 66 to facilitate insertion into connector 46 and establish a firm but sliding fit. An o-ring 76 is seated in a circumferential groove between connector 46 and probe body 60. O-ring 76 is an elastomeric seal and functions to seal the connection between probe 42 and the access port into which probe 42 is threaded (FIG. 5).

A digital circuit board 78 and an RF circuit board 80 are mounted in housing 44. The circuitry on boards 78 and 80 are not shown in FIGS. 6 and 6B, but will be described below with reference to FIGS. 7 and 8. Boards 78 and 80 are disc-shaped. Boards 78 and 80 are connected together by means of a board interconnect 82 (see also FIG. 6A) and are spaced apart by a brass spacer 84. Board 78 is soldered to end cap 62 and spacer 84 by means of a solder ring 86. RF board 80 is soldered to end cap 62 and probe body 60 by means of another solder ring 88. An LED 90 is mounted on the right side (as viewed in FIG. 6B) of digital board 78 and functions as an indicator light to indicate that probe 42 is in electrical contact with the seizure screw and is working properly. An aperture 92 is contained in a rear end wall 63 of cap 62 and is in line of sight with LED 90, to allow light from LED 90 to be emitted through cap 62. A transparent lens 94 seals aperture 92.

Figure 6B:
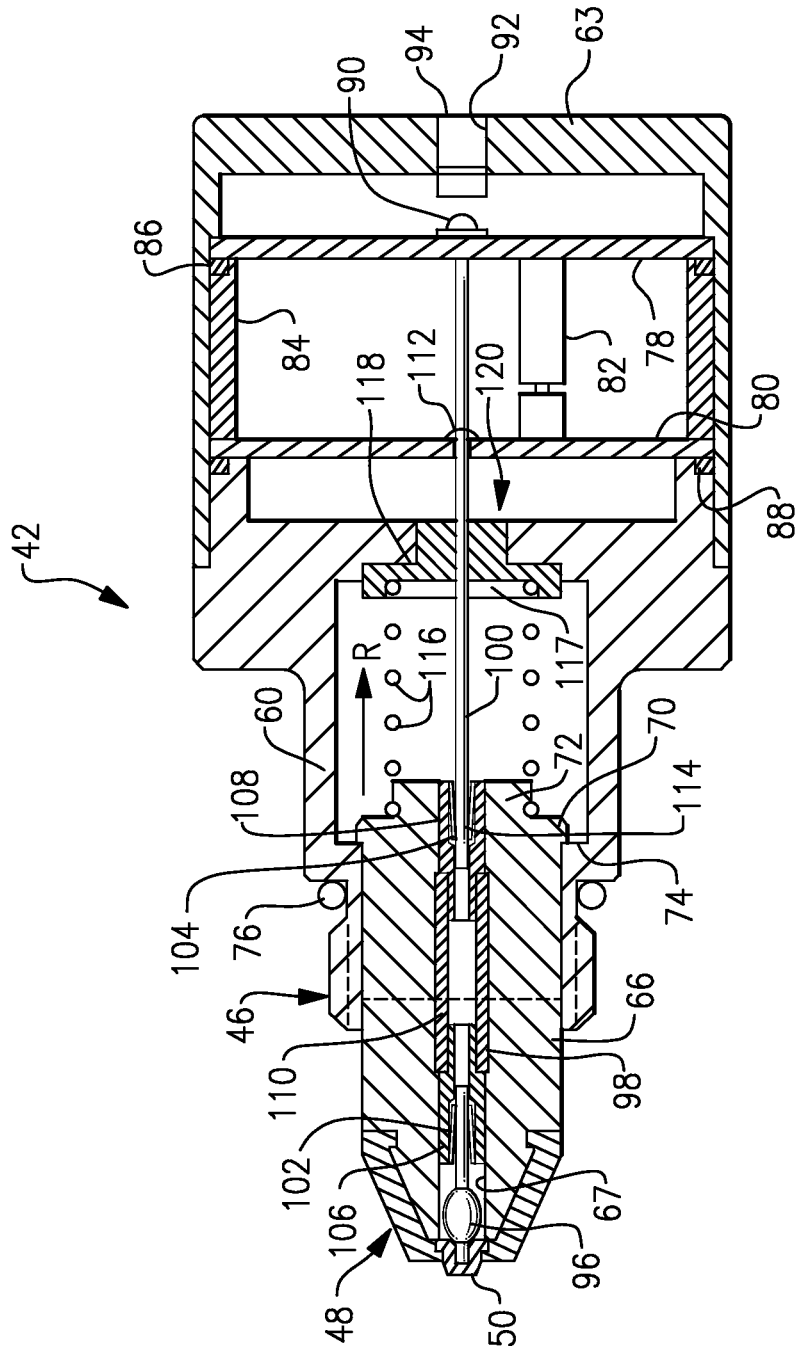
FIG. 6B is an enlarged cross sectional view of the probe.

The electrical contact assembly of probe 42 is best shown in FIG. 6B. The contact assembly comprises seizure contact tip 50 made of nickel-plated brass, a leaded ferrite bead 96, a dual-socket female conductor assembly 98, and a male pin conductor 100. Contact tip 50 is partially mounted in a cylindrical hole 67 through insulator body 66. Ferrite bead 96 and conductor assembly 98 are mounted in hole 67. Contact tip 50 is secured in place by insulator cap 68, which engages a circumferential groove or shoulder in contact tip 50. The left lead (as shown in FIG. 6B) of ferrite bead 96 is cut short and soldered inside contact tip 50. Male pin conductor 100 is made from the same wire used for a male conductor or stinger of a CATV trap filter. Conductor assembly 98 includes two multi-point spring contacts 102 and 104, press fitted into corresponding hollow ("female") conductor pins 106 and 108, respectively. Contacts 102 and 104 are the same as the contacts shown and described in U.S. Pat. No. 6,674,343. As seen in FIG. 6B, contacts 102 and 104 have their insertion ends in opposite directions. The right lead (FIG. 6B) of ferrite bead 96 is inserted into and held by contact 102. Female conductor pins 106 and 108 are coupled together by a cylindrical nickel-plated brass tube 110. Pins 106 and 108 are preferably soldered to tube 110. As shown in FIG. 6B, conductor assembly 98 is generally hollow through and through. Male pin 100 has an output end 112 fixedly mounted to RF circuit board 80, and an input end 114 inserted into contact 104. Thus, an electrical connection is established between a seizure screw of a network device, into which probe 42 is threaded, and RF circuit board 80.

Experience has taught that the seizure or access ports on various network devices have different lengths. Therefore, the length of probe tip 48 would need to be reduced or extended depending on the length of the ports. This would require the manufacture and inventorying of different length probes. Such a requirement would not be an ideal situation for the manufacturer or network operator. The probe of the present invention overcomes this problem by spring loading probe tip 48, so that it can self-adjust to the correct length upon being threaded into the seizure or access port. As shown in FIG. 6B, a spring 116 is mounted directly to tail section 72 at one end, and at its other end, spring 116 is seated in a cylindrical recess 117 contained in a moisture seal 118. Spring 116 imposes an outward force on tip 48 (to the left in FIG. 6B). Insulator body 66 is in sliding engagement with the interior wall surface of connector 46. Insulator body 66 is pushed outward by spring 116 to a point where it is stopped by engagement of flange 70 with shoulder 74. When probe 42 is threaded into an access port that has a length shorter than the fully extended tip 48, tip 48 is pushed inward (to the right in FIG. 6B) against the force of spring 116. Male pin 100 remains stationary and conductor assembly 98 slides over male pin 100, as tip 48 is pushed inward. The sliding engagement of conductor assembly 98 over male pin 100 is made possible because assembly 98 is generally hollow.

As shown in FIG. 6B, moisture seal 118 is press fitted into an opening 120 contained in probe body 60. Seal 118 and opening 120 each have two corresponding diameters. The larger diameters of seal 118 and opening 120 allow for a secure seating of spring 116 in recess 117. The two diameters of seal 118 and opening 120 also aid in effecting a good moisture seal. Seal 118 is made of a low density polyethylene, or a polypropylene, or other appropriate seal material. Seal 118 seals the interface between male pin 100 and seal 118 and the interface between probe body 60 and seal 118.

Probe 42 serves to mark the location in coaxial plant 10, downstream of which the impairment is located. Probe 42 introduces a very slow and insignificant amount of attenuation (in the range of about 0.2 dB to about 2 dB) over a limited portion of the return path frequency band (e.g., 5-20 MHz). The slow modulation period and small attenuation value make its presence insignificant and not intrusive to any return path services. Preferably, probe 42 should only be installed in parallel branches of the network—this eliminates cascading of probes and the accumulation of return path attenuation by cascaded probes, which could possibly have a detrimental effect on the network.

Powering of probe 42 comes from the AC line power used to power coaxial plant 10. Each probe 42 employed in a node of plant 10 has a unique characteristic or personal identification code. This personal identification code can be formed in a variety of ways. For example, if simple frequency division is use, each probe 42 could have its own assigned amplitude modulation (AM) frequency. As an alternative, code division or a combination of methods could be used. Frequency division methods are simple to realize, however the number of channels is limited (which therefore limits the number of personal identification code numbers). Further, the frequency division method demands lengthy signal recognition to achieve the required resolution. Code division techniques, such as the Gold or Kasami sequences could be used to create a larger number of ID combinations with minimal code length and minimum decoding correlation complexity. As an example, a 63 bit code length Kasami sequence will allow up to 520 unique ID codes. The choice of which code technique to adopt for the identification code depends upon practical considerations such as, e.g., cost, complexity, and the number of probes or encoders to be deployed in a network or node.

Figure 7:
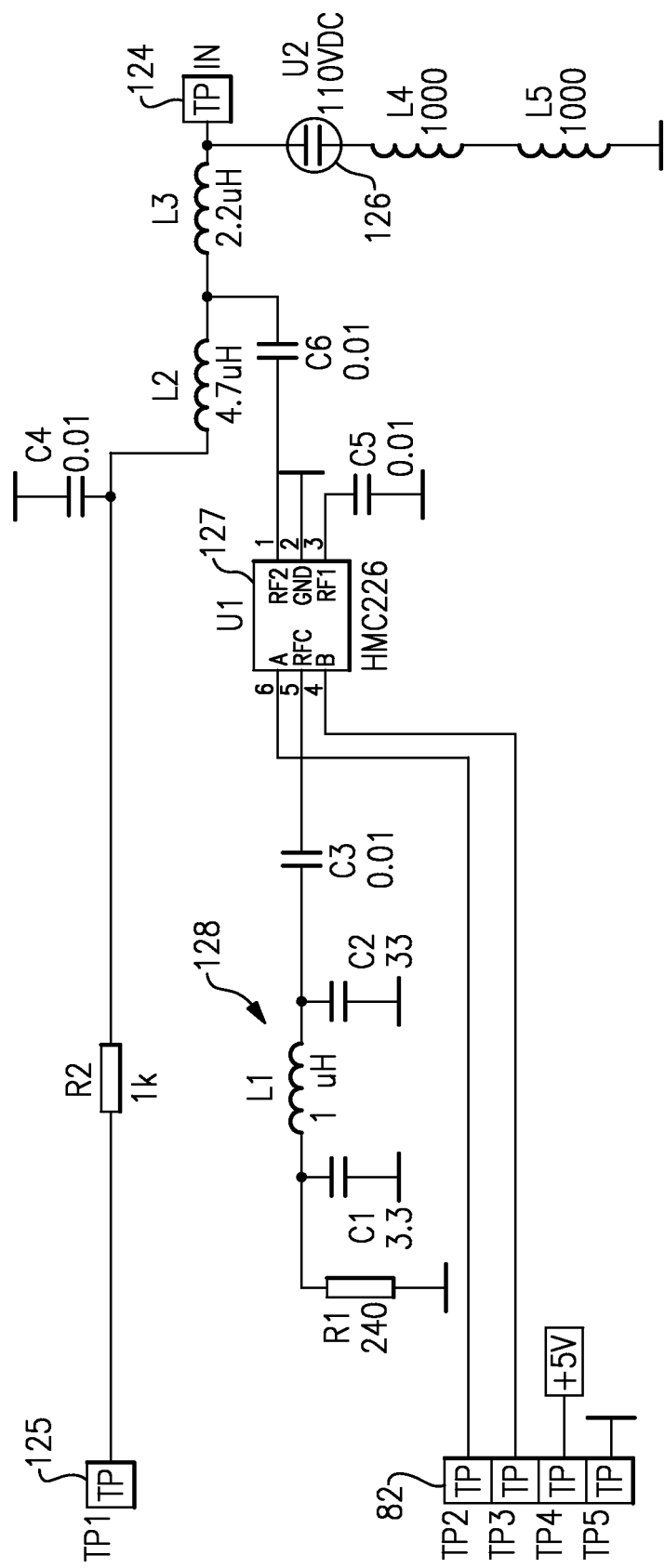
FIG. 7 is a schematic diagram of an RF circuit installed in the probe of FIG. 6.

The schematic of the circuitry mounted on RF circuit board 80 is shown in FIG. 7. The signals received by probe 42 (through contact tip 50) enter the circuitry on board 80 through an input 124. A shunt branch, comprising gas tube 126 and ferrite beads L4 and L5, is connected between input 124 and ground. Gas tube 126 functions to protect the circuitry from power surges. Ferrite beads L4 and L5 are required to handle current surges and reduce glitches at high frequencies caused by gas tube 126. A series inductor L3 is connected between input 124 and a blocking capacitor C6. Inductor L3 provides high frequency isolation to the circuit. An inductor L2 and capacitor C4 function as a lowpass circuit allowing AC power to pass to an isolation resistor R2 and to an output 125. The AC power signal from output 125 is routed through interconnect 82 to digital circuit board 78. As shown in FIG. 7, a microprocessor controlled switch 127 is connected between blocking capacitor C6 and a blocking capacitor C3. A capacitor C5 is connected to the RF1 pin of switch 127.

An impedance circuit 128 is connected to blocking capacitor C3. Impedance circuit 128 includes a lowpass filter, C1, L1 and C2, and a resistor R1. Impedance circuit 128 imparts a small attenuation (e.g., 0.5 dB) over a portion of the return path frequency band. The portion of the return path frequency band over which the attenuation is imparted is defined by the lowpass filter, C1, L1 and C2. In one embodiment, the portion of the return path frequency band is about 5-20 MHz. Impedance circuit 128 effectively loads down (e.g., by 0.5 dB) the network downstream of the point where probe 42 is connected, in the selected portion of the return path frequency band (e.g., 5-20 MHz). Switch 127 is opened and closed under the control of a microprocessor located on digital board 78, at a periodic rate uniquely assigned to the particular probe 42. This rate is the ID code for the probe (i.e., the ID encoder). When switch 127 is closed, attenuation circuit 128 loads down the return path signals. When switch 127 is opened, the return path signals are unaffected.

Figure 9:
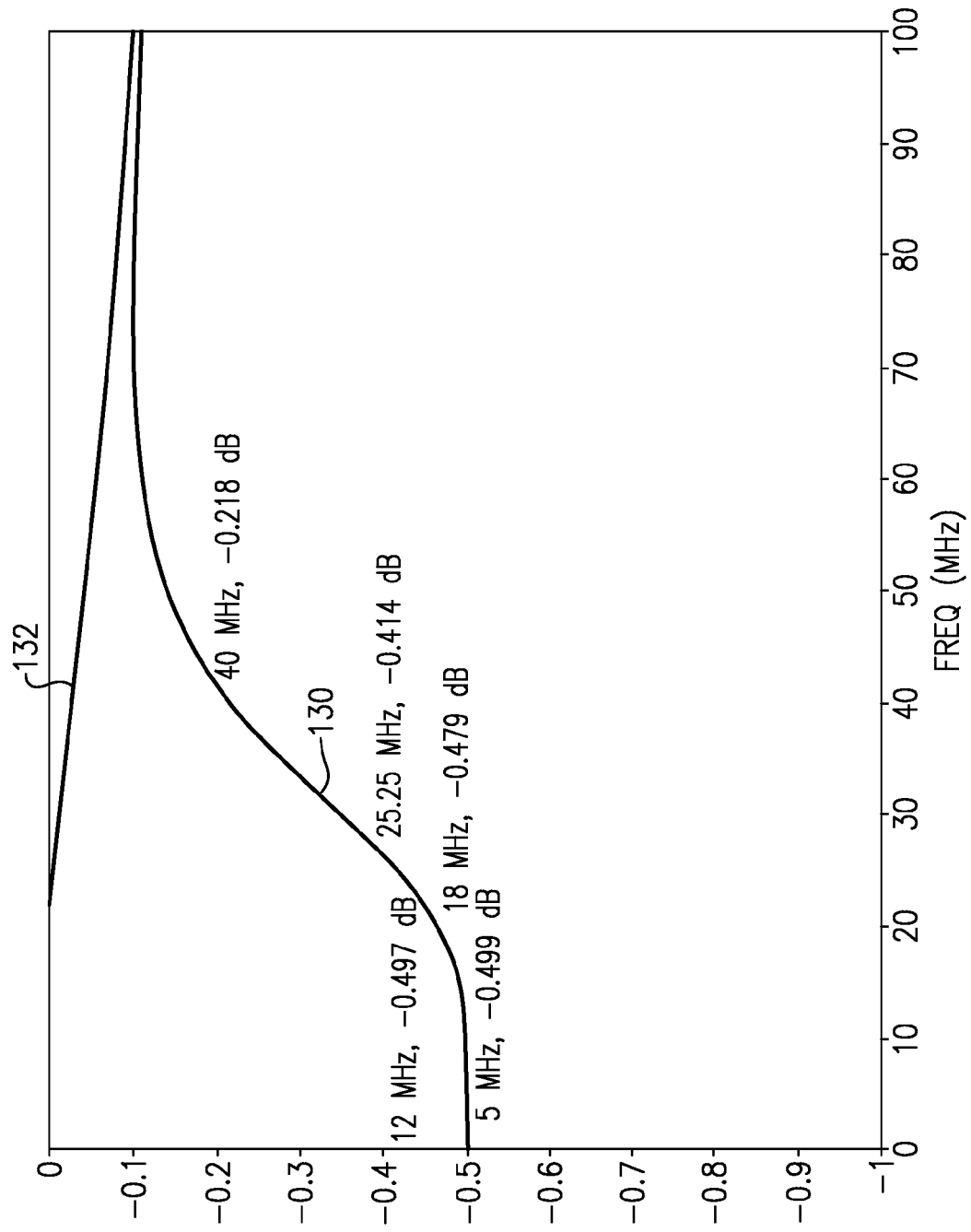
FIG. 9 is a frequency response plot of the probe in FIG. 6.

A typical frequency response plot of probe 42 is shown in FIG. 9. The y-axis is attenuation in tenths of a dB, and the x-axis is frequency from 0-100 MHz. Curve 130 is the response of probe 42 when attenuation circuit 128 is switched into the network and curve 132 is the response of probe 42 when attenuation circuit 128 is switched out of the circuit.

Figure 8:
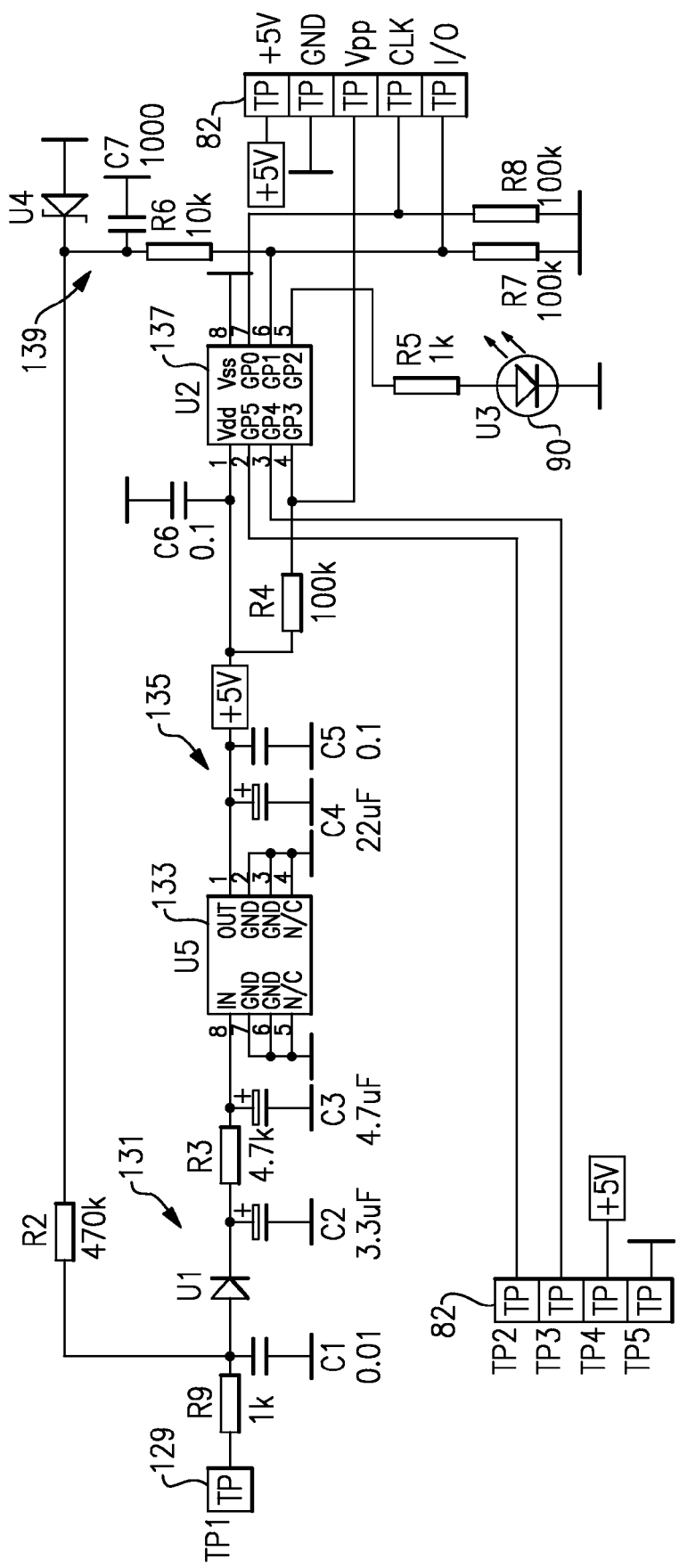
FIG. 8 is a schematic diagram of a digital circuit installed in the probe of FIG. 6.

The schematic of the circuitry mounted on digital circuit board 78 is shown in FIG. 8. The AC power signal from RF circuit board 80 is received through input 129. A rectifier circuit 131, comprising resistor R9, capacitor C1, diode U1, capacitor C2, resistor R3, and capacitor C3, converts the AC power signal to a rectified DC signal. A DC-to-DC converter 133 is connected between the output of rectifier circuit 131 and a DC filter circuit 135, comprising capacitors C4 and C5, resistor R4, and capacitor C6. A microprocessor 137 is connected at the output of DC filter circuit 135. LED 90 is powered by microprocessor 137 through a bias resistor R5. The 60 cycle AC power signal is drawn through resistor R2 and brought to a signal generating circuit 139, comprising a zenor diode U4, a capacitor C7, and resistors R6 and R7. Signal generating circuit 139 produces a positive sine wave signal that is received in pin 6 of microprocessor 137. The sine wave signal is applied to the input of a Schmitt trigger circuit integrated inside microprocessor 137. The Schmitt trigger circuit produces clock pulses for the microprocessor. A clock output signal is presented at pin 7 of microprocessor 137 and is routed to a clock port CLK of board interconnect 82 by means of output resistor R8. The control signals for opening and closing switch 127 (on RF board 80) are presented at pins 2 and 3 of microprocessor 137. These control signals are transmitted to RF board 80 via connections TP2 and TP3 of board interconnect 82. Microprocessor 137 is programmed to cause switch 127 to switch at the assigned ID rate.

Under some circumstances, it may be desirable to integrate the circuitry of probe 42 into a network device like a splitter, multi-tap, or amplifier—which would be a relatively easy undertaking.

When probe 42 is connected to a network device, it creates a condition wherein any signals, including CPD or noise signals, will be similarly modulated in the range of frequencies where the probe circuitry is switched. If there are no signals present, then the noise floor will be modulated. This modulation is so slow and of such low attenuation value that its effect on the transmitted signals (e.g., return path traffic) will be insignificant. It has been determined that the attenuation can be as low as 0.2 dB and achieve reliable decoding of the modulation frequency.

At the detection and decoding location (either at the headend or in the field), the modulation is detected and the individual identification code is resolved. Once the code is resolved it is a simple task to look up records of where the device with this code is currently installed, allowing the technician to greatly simplify the required troubleshooting process. This technique can be used to locate noise and ingress. Alternatively it can be used with other equipment like the Arcom Digital Hunter® System to resolve the location of CPD, which like the ingress will be similarly modulated. If either CPD or ingress is modulated in a fashion consistent with an installed probe (encoder), the source of the impairment generating the CPD or ingress must be located downstream of the probe (encoder). There can be multiple encoder devices installed in a node, each requiring a unique modulation frequency or other code ID. If it is desired that the measurement be done in the field, it is possible that duplicate codes could be used in a node if the duplicate devices are located in different legs of the plant and separate measurement points for the different legs are accessible.

Figure 10:
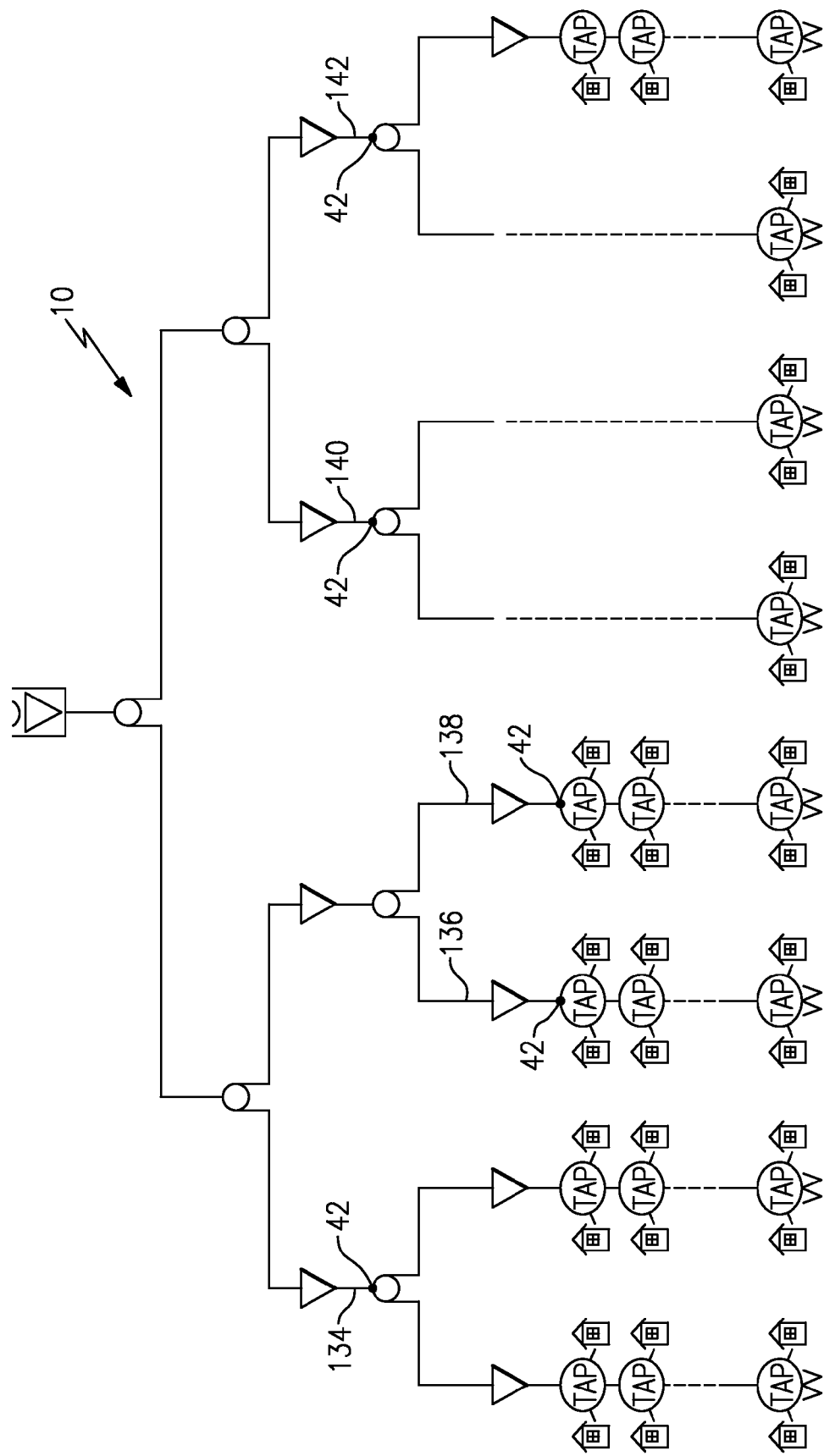
FIG. 10 is a schematic diagram of a coaxial portion of a network plant.

The number of probes or encoders deployed can vary depending upon preferences of the operator. A reasonable number for the purposes of this system would be to place a probe at the first network device after the last active (i.e., amplifier) in each branch of the network. Because of additive losses, added complexity in resolving the probe IDs of cascaded probes, and uncertainty related to return loss of cascaded probes—it is not recommended that multiple probes be cascaded. While, technically, it creates no insurmountable problem to cascade probes, it could create situations where multiple probes in series could adversely affect the network performance. Since probe 42 requires network power, the placement of probes 42 may be predicated upon the location of the most downstream or last powered device within the network. As such, it may not be possible to place one probe in each leg. An analysis of typical node architectures in modern HFC plants shows that a typical number of probes placed in a node would be approximately 20-40. Typical points of installation are shown in FIG. 10. In FIG. 10, coaxial cable network plant 10 contains five probes 42, installed in network branches 134, 136, 138, 140 and 142, respectively.

When a probe is attached to a device, the return path noise floor and return path traffic downstream of the device will become modulated with a unique characteristic corresponding to the particular period of the modulation, that which we refer to as the device's personal ID. When ingress or CPD is present in the network downstream of the location of the probe, the ingress or CPD will be similarly modulated. Using signal processing techniques contained within equipment located upstream of the probe, the signal is demodulated or decoded such that the modulation frequency or code can be determined and then compared to the personal ID codes of all the probes contained in the node. The physical zone or part of the network from which the CPD or ingress is originating can then be easily found. Each installed probe will therefore be a marker, clearly pointing to where in the network ingress or CPD is originating. Each device will operate independently with no requirement of control or addressability.

Several methods of implementing the system can take place depending upon the desired level of automation. Systems could be employed that automatically monitor nodes and calculate personal ID codes for probes located in the plant upon CPD or ingress exceeding threshold levels. A more practical approach and the preferred embodiment is for a return path monitoring system to be employed at the headend. When a CPD or noise condition is seen on a node, a technician then uses resolving or decoder equipment either at the headend or at a location in the plant in order to resolve the individual ID code.

Figure 11:
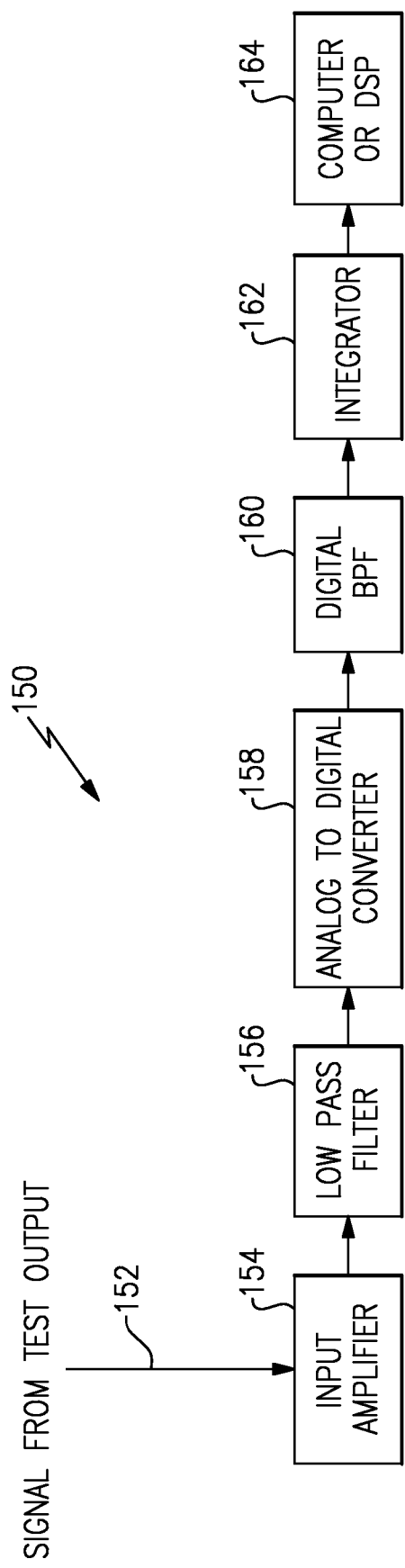
FIG. 11 is a block diagram of the signal processing steps for noise impairment detection performed in the systems of FIGS. 1 and 2.

A block diagram of a device 150 used for ingress signal processing is shown in FIG. 11. Device 150 is first connected to the network through a return test point. The signal is received via an input 152 and then amplified by an amplifier 154. The amplified signal is then filtered by low pass filter 156. The filtered signal is then digitized by an analog-to-digital converter (ADC) 158 and then filtered by a digital bandpass filter (BPF) 160. The passband of BPF 160 is less than or equal to the frequency band in which encoder 12 (or probe 42) modulates the ingress. Therefore if the AM modulation was implemented in the range of 5-20 MHz, BPF 160 could also be 5-20 MHz. If data or telemetry or other signals or carriers are used by the operator within this same frequency band, then BPF 160 could be made narrower to filter out these signals. The passband of BPF 160 is selected such that useful signals (from the cable operators' perspective) are filtered out, and in the case of using the equipment to search for ingress—the maximum amount of ingress modulated from encoder 12 (or probe 42) remains. In the case of using the equipment to more narrowly search for CPD, BPF 160 is only required to pass the return frequency used by the Hunter® System to monitor for CPD.

When Resolving an Ingress Source:

After passing BPF 160, the signals enter an integrator 162 which continuously sums the ingress samples squared, within certain time intervals. The signal at the output of integrator 162 looks like this:

$$S(i) = 1/N \sum_{j=k*i}^{N+K*i} x(j)^2$$

Where X(j) is the readout of a digital signal at the output of BPF 160 during the moments of time Tj, following the interval of digitization in ADC 158, delta (Tj)=Tj−T(j−1); K is the integer factor defining the relationship between the signal digitization frequencies at an input and an output of integrator 162 (K>1); and N is the quantity of signal X(j) samples accumulated in integrator 162.

Signal S(i) is a representation of the signal power, or more specifically the average energy of noise X(j) over a time interval of N samples. Thus integrator 162 represents a noise accumulator in which for digitized time intervals, the noise energy for a previous time interval N*delta (Tj) is continually estimated. If the given time interval is less than the period of the noise AM modulation from encoder 12 (or probe 42), then integrator 162 will work as an RMS detector.

Since signal S(i) is at a relatively low frequency, its sampling for the subsequent digital processing is done at a much lower frequency than the sampling of the direct noise source X(j). An example of the parameters of a practical realization of device 150 (FIG. 11) is now given. For digitization of the 5-42 MHz return path signal of a typical HFC network in the United States, a 10-bit resolution and 100 MHz frequency can be chosen for ADC 158 (e.g., model AD9215 available from Analog Devices Company). BPF 160 and integrator 162 are easily realizable with a modern Field Programmable Gate Array (FPGA). Since integrator 162 works as a peak detector, the accumulation time in integrator 162 (or quantity of summed samples) should be chosen to be as long as possible, but less than the minimal period of AM modulation realized and implemented in encoder 12 (or probe 42). As an example, assume the minimal AM modulation period in encoder 12 (or probe 42) is 2 seconds. The accumulation time in integrator 162 can be chosen to be 0.5 seconds. Integrator 162 should therefore collect N=100^6*0.5 or 50^6 (fifty million) samples of noise signal X(j).

The output of integrator 162 represents a noise envelope AM modulated with a frequency of a single Hz. To digitize this low frequency signal it is sufficient to use a frequency of 20 Hz. Therefore, samples of the integrator output signal S(i) will be taken with a period of 50 milliseconds, while samples of noise enter integrator 162 with a period of 10 nanoseconds (100 MHz). This corresponds to an integer factor of K=5^6. Technical realization of these parameters is easily achievable.

The output signal of integrator 162 then enters a computer or a digital signal processor (DSP) 164. The integrator output signal is of a rather low frequency; therefore the data transmission process will cause no problems. Computer 164 accumulates the data file sufficient for AM demodulation and the corresponding encoder 12 (or probe 42) ID code detection (i.e., decoding).

The minimal duration of the signal entering computer 164 for processing should be selected based primarily on ensuring reliable AM signal detection and selection of adjacent ID codes. For example, in the case of using frequency coding ID codes (code selection by AM frequencies) and a choice of 20 coding frequencies distributed over regular intervals, in a range from 0.5 up to 1 Hz, the frequency interval between adjacent codes will be 0.5 Hz/20=0.025 Hz. For division of such codes with the use of classical Rayleigh criterion, it is necessary to provide the minimal duration of signal analysis equal to 1/0.025=40 seconds. An increase in the number of codes will result in a proportionally increased time duration required for analysis of the received signal. Under real conditions within a cable television network, the AM signal is received on a background of various sorts of jamming signals caused by ingress signal instability; therefore, it will be necessary to increase the time duration of the received signal to ensure proper reception. From the point of view of a practical realization, it is reasonable not to fix rigidly the signal analysis time but only to limit it to some reasonable value, for example, several minutes. If within the limits of this time interval the AM code is detected by the chosen criterion (for example, signal-to-noise-ratio (SNR)), then the process of signal reception can be easily stopped.

Figure 12:
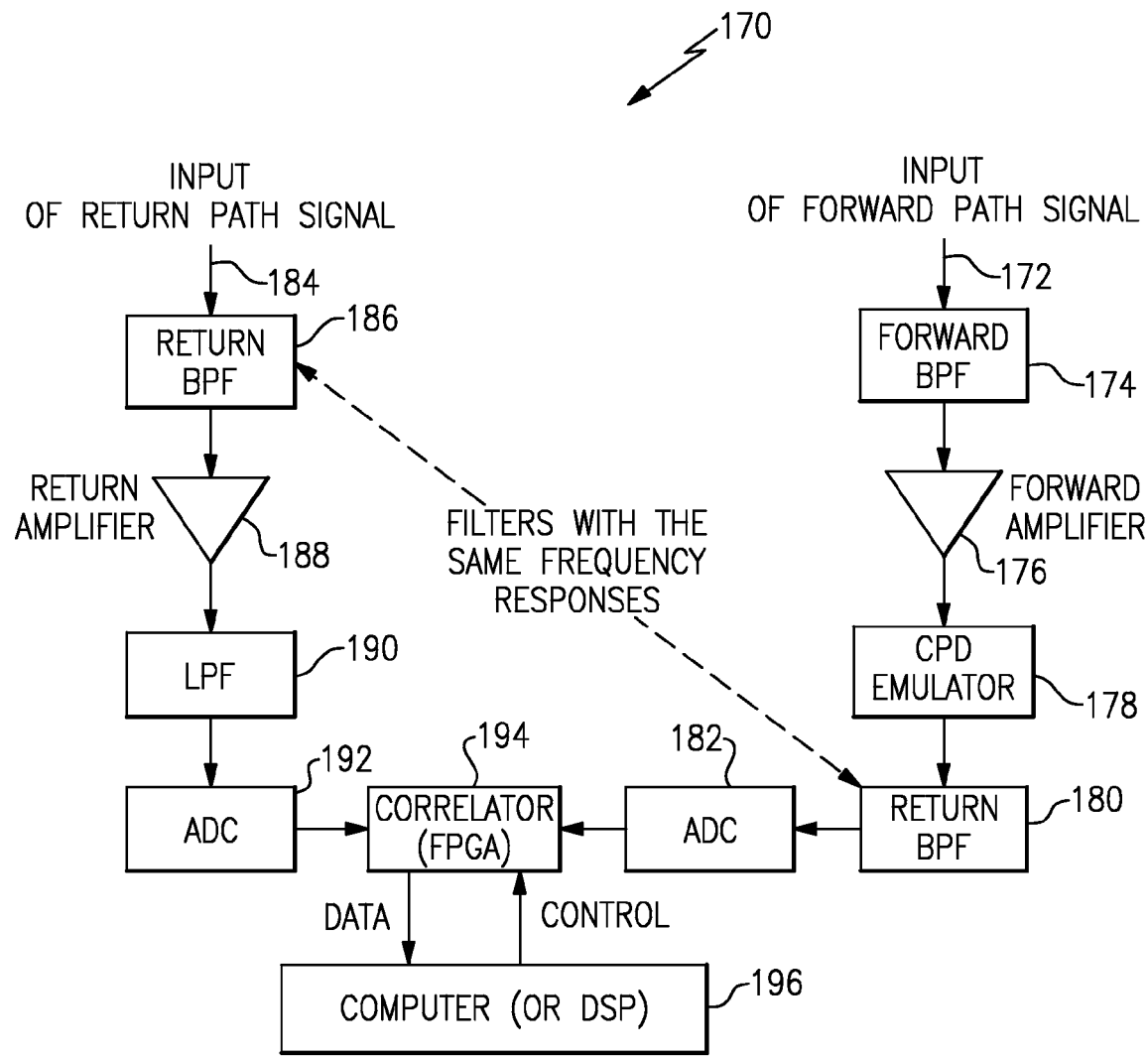
FIG. 12 is a block diagram of the signal processing steps for CPD impairment detection performed in the systems of FIGS. 1 and 2.

When Resolving a CPD Source:

A block diagram of a device 170 for locating CPD sources is shown in FIG. 12. FIG. 12 is very similar to the block diagram of the Arcom Digital commercial Xcor® radar and contains all of the same basic elements. See U.S. Published Application No. US 2006/0248564 A1 (published Nov. 2, 2006). The operational difference of using it for encoder 12 (or probe 42) detection (i.e., decoding) consists of adding an additional data processing algorithm implemented in a computer (or DSP). The device works as follows. Forward path signals enter device 170 at an input 172 and then are filtered by a bandpass filter (BPF) 174, wherein a part of the forward path spectrum containing only QAM signals is selected. The selected QAM signals are amplified in an amplifier 176 and then enter a CPD emulator 178. CPD emulator 178 represents a nonlinear element, for example, a diode from which second order products from the QAM signals are formed. Second order products from the QAM signals represent a noise signal with practically uniform spectral density in the range of return path frequencies ("formed noise signal"). By means of a bandpass filter BPF 180, selection of a part of the formed noise signal spectrum is carried out. The part selected is a zone of frequencies where there are no return path service signals. Precisely the same part of the signal spectrum is allocated in the channel of return path signal reception (left-side channel in FIG. 12). The signal at the output of BPF 180 will now be referred to as the "reference signal." The reference signal is digitized by an analog-to-digital converter 182.

As shown in FIG. 12, return path signals enter device 170 at an input 184 and are filtered by a bandpass filter (BPF) 186. BPF 186 has the same frequency response as BPF 180. The bandpass filtered signals are then amplified by an amplifier 188. The signals at the output of amplifier 188 are filtered by lowpass filter 190 and then digitized by analog-to-digital converter 192. These signals contain what we will term an "echo" signal from CPD sources (but in reality is not an echo, but second order intermodulation products from the forward QAM signals). The echo signal is the same as the reference signal, however, in the return path channel, the echo signal is delayed by time, corresponding to the time delay distance to the CPD source in the cable network. For echo signal detection in the return path, a digital correlation receiver 194 is used. The digitized versions of the reference signal and echo signal enter digital correlator 194 (FIG. 12).

Figure 13:
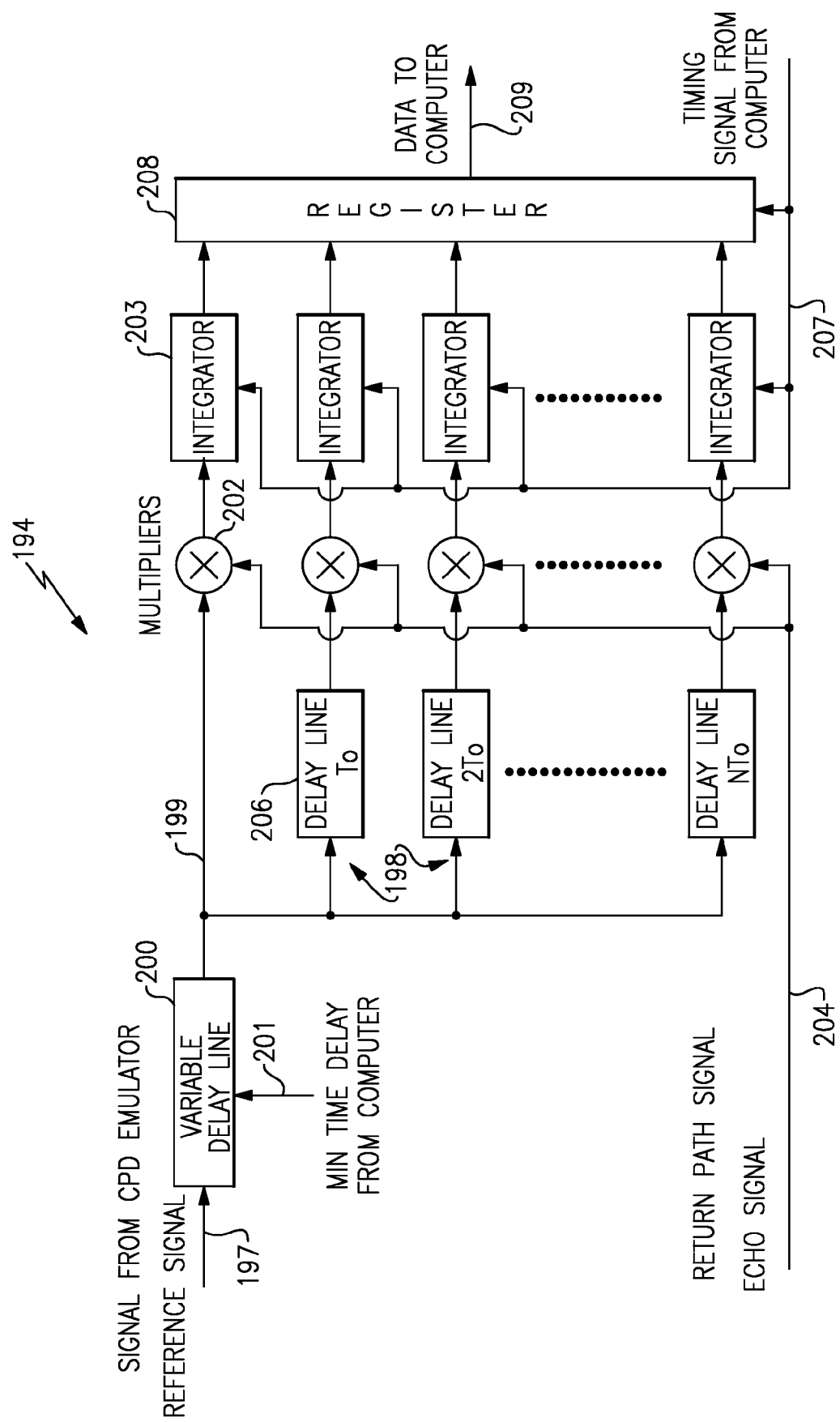
FIG. 13 is a block diagram of a correlator used in CPD impairment detection in the systems of FIGS. 1 and 2.

A block diagram of digital correlator 194 is shown on FIG. 13. Correlator 194 can be implemented in a field programmable gate array (FPGA). Correlator 194 has an input 197 (for receiving the reference signal) and N channels 198 with a uniform incremental delay To. Correlator 194 has an additional channel 199 with no delay. The reference signal is delayed by a minimum time delay in a variable delay line 200. The minimum time delay is controlled by a control signal from a computer 196 (FIG. 12). The control signal enters variable delay line 200 at an input 201. Channels 198 and 199 each include a multiplier 202 and an integrator 203. The echo signal from ADC 192 (FIG. 12) enters correlator 194 at an input 204. The echo signal enters an input of each multiplier 202 of channels 198 and 199. The delayed reference signal from delay line 200 enters channels 198 and 199. The delayed reference signal then enters multiplier 202 in channel 199 without a further delay, and enters multipliers 202 in channels 198 after being delayed by incremental delay lines 206, respectively. Delay lines 206 introduce the incremental delay, N*To, as indicated above. The outputs of multipliers 202 are integrated in integrators 203, respectively, and the results are stored in a register 208. Control of the integration time of integrators 203 and the readout of integration results from register 208 are accomplished by a timing signal from computer 196. The timing signal enters integrators 203 and register 208 via a control line 207. The integration results from register 208 are directed to computer 196 via an output 209.

The delay increment To of channels 198, as a rule, corresponds to the period of digitization of signals in ADCs 182 and 192 (FIG. 12). For example, choosing a frequency band for echo signal reception (i.e., passband of BPF 186) within the limits of 8-16 MHz, it is expedient to choose the frequency of digitization in ADCs 182 and 192 to be on the order of 40 MHz. Thus time To=25 nsec. The number of channels 198 in correlator 194 and the time delay in variable delay line 200 are selected so that a full possible range of time delays of echo signals from CPD sources is covered. For example, if the time delay in the optical cable portion of the HFC network (CPD cannot occur within fiber) is 100 micro seconds, and the maximum time delay within the coaxial portion of a particular node of the HFC network does not exceed 25 micro seconds, then for the guaranteed overlapping of possible times of arrival of the echo signals, it is expedient to choose a time delay in variable delay line 200 equal to 95 micro seconds, and the number of correlation channels equal to (10+25) Micro sec/To=(10+25)/0.025 =1400.

Voltage readouts from the outputs of each correlation channel are synchronized to the integration time in integrators 203, and the readouts are then transferred to computer 196 (FIG. 12). It has been experimentally established that the time of integration for each integrator 203 should be from 20 to 200 msec for reliable detection of echo signals. The voltage readouts from all of the correlator channels form a signal representing the cross-correlation function. This signal has the form of a short radio impulse with the center frequency equal to the average frequency of the echo signal spectrum. In the above example, at a frequency band of 8-16 MHz, the center frequency is equal (8+16)/2=12 MHz. In computer 196 (FIG. 12), the selection of the signal envelope is realized and comparison of the received maximum value with a chosen detection threshold is carried out.

Figure 14:
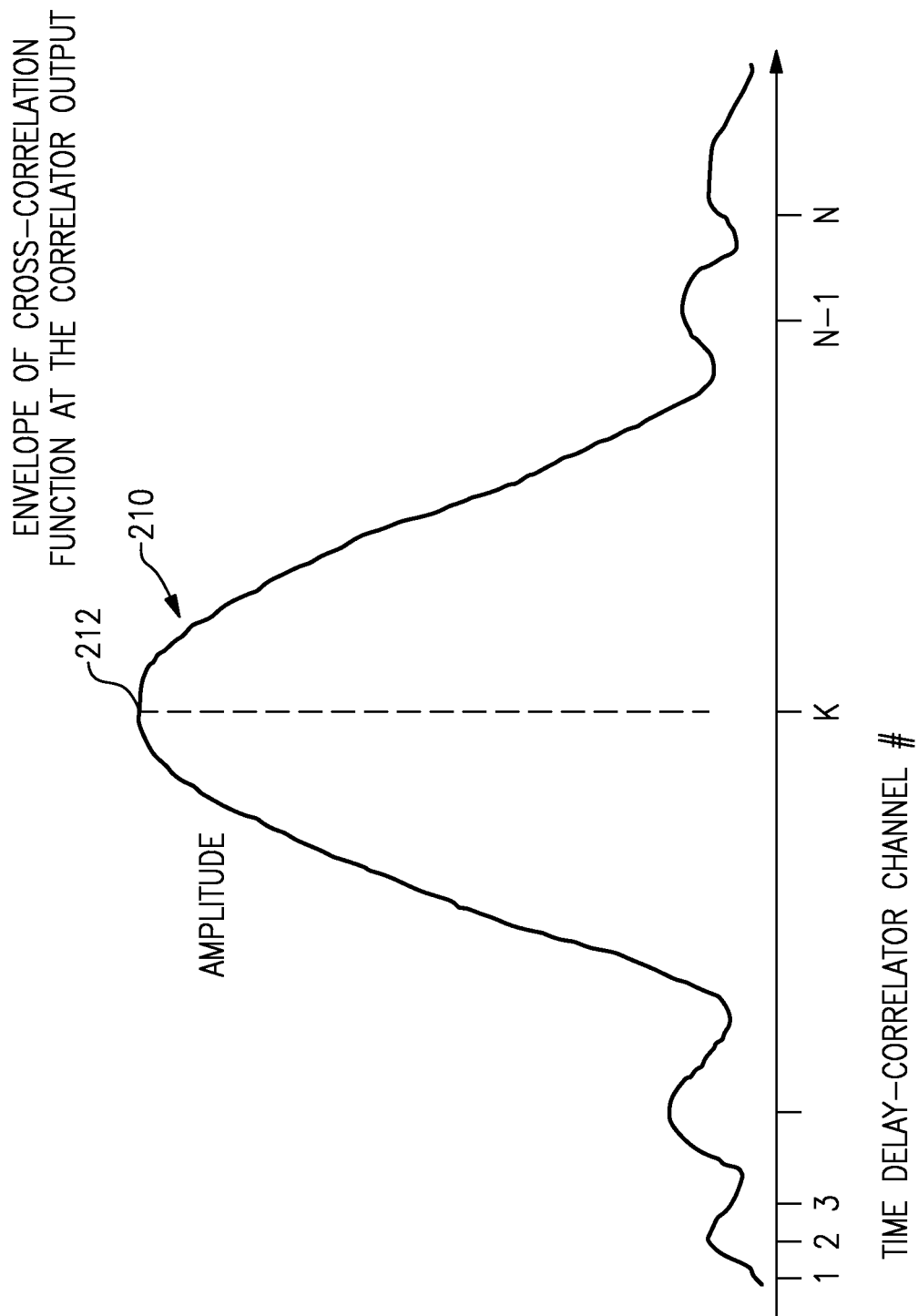
FIG. 14 is a plot of the correlation function from the correlator of FIG. 13.

In FIG. 14, a typical form for the signal envelope at the output of correlator 194 is shown. The signal shown in FIG. 14 has a maximal amplitude in channel K, i.e. for the example above with the variable time delay set at 95 micro seconds—the measured value of time delay of the echo signal is equal 95+KTo=95+K 0.025 micro seconds.

After the echo signal is detected, the maximum amplitude values of the cross-correlation function envelope are accumulated, which correspond to measured time delay (corresponds to correlator channel K). These values are formed in computer 196 after reception of data from correlator 194, with the time intervals equal to the integration time in integrator 203. If an encoder 12 (or probe 42) is installed between a CPD source and the point of echo signal reception, then the signal of the maximum amplitude at the correlator output will have amplitude modulation which frequency corresponds to the ID of the encoder or probe (in the case of frequency division IDs). The remaining processing of the signal of the maximum amplitude cross-correlation function in computer 196 consists of defining the AM frequency for identification of encoder 12 (or probe 42) (i.e., decoding), which can be carried out by the ordinary spectral analysis method. The required accumulation time of signal readouts is selected the same way as is performed in the case of the ingress analysis defined previously.

U.S. Published Application No. US 2006/0248564 A1, published on Nov. 2, 2006, and U.S. Published Application No. US 2004/0245995 A1, published on Dec. 9, 2004, are incorporated herein by reference.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. A system for locating an impairment in a coaxial cable portion of a hybrid fiber-coax network, comprising:
   an encoder configured to couple to the coaxial cable portion of the network at a predetermined encoding point upstream of the impairment, said encoder including electronic circuitry adapted to automatically encode an identification code on a signal originating downstream of the encoding point and associated with the impairment;
   an impairment detector, configured to couple to the network at an access point upstream from the encoding point and to receive signals from the network, said detector adapted to detect from the received signals the signal associated with the impairment and generate a detected signal therefrom;
   a decoder, associated with said impairment detector, and adapted to decode the identification code of said encoder from the detected signal; and
   means, associated with said decoder, for identifying said encoder and the predetermined encoding point from the identification code,
   whereby the location of the impairment is determined to be downstream of the predetermined encoding point.

2. The system of claim 1, wherein the electronic circuitry of said encoder is adapted to encode the signal associated with the impairment by amplitude modulating it at an assigned rate, the assigned rate being the identification code.

3. The system of claim 1, wherein said encoder is configured as a probe having a housing portion and a connector portion, the electronic circuitry of said encoder being enclosed within the housing portion, the connector portion being configured to connect to a network device in the network to establish electrical communication between the electronic circuitry of said encoder and the network.

4. The system of claim 1, wherein the impairment is common path distortion, and wherein said impairment detector is adapted to detect a signal produced by the common path distortion.

5. The system of claim 4, wherein said impairment detector includes a correlator having first and second inputs and an output, the signal produced by the common path distortion is received by the correlator on the first input and a locally generated reference signal is received on the second input of the correlator, the reference signal being an emulated version of the signal produced by the common path distortion, the signal produced by the common path distortion being cross-correlated with the reference signal to generate a cross-correlation signal at the output of the correlator, and wherein said decoder is adapted to decode the identification code of said encoder from the cross-correlation signal.

6. The system of claim 1, wherein the impairment is ingress, and wherein said impairment detector is adapted to detect the ingress.

7. A system for locating an impairment in a coaxial cable portion of a hybrid fiber-coax network, comprising:
    an encoder configured to couple to the coaxial cable portion of the network at a predetermined encoding point upstream of the impairment, said encoder including electronic circuitry adapted to automatically encode an identification code on a signal originating downstream of the encoding point and associated with the impairment;
    a detector and decoder unit, configured to couple to the network at an access point upstream from the encoding point and to receive signals from the network, said detector and decoder unit including—
        impairment detection electronic circuitry adapted to detect from the received signals the signal associated with the impairment and generate a detected signal therefrom, and
        decoding electronic circuitry adapted to decode the identification code of said encoder from the detected signal; and
    means, associated with said detector and decoder unit, for identifying said encoder and the predetermined encoding point from the identification code,
    whereby the location of the impairment is determined to be downstream of the predetermined encoding point.

8. The system of claim 7, wherein the impairment detection electronic circuitry includes a computer to aid in the detection of the signal associated with the impairment.

9. The system of claim 7, wherein the decoding electronic circuitry includes a computer programmed to decode the identification code of said encoder.

10. A system for locating an impairment in a coaxial cable portion of a hybrid fiber-coax network, comprising:
    an encoder, coupled to the coaxial cable portion of the network at a predetermined encoding point upstream of the impairment, said encoder including electronic circuitry adapted to automatically encode an identification code on a signal originating downstream of the encoding point and associated with the impairment;
    an impairment detector, coupled to the network at an access point upstream from the encoding point to receive signals from the network, said detector adapted to detect from the received signals the signal associated with the impairment and create a detected signal therefrom;
    a decoder, associated with said impairment detector, and adapted to decode the identification code of said encoder from the detected signal; and
    means, associated with said decoder, for identifying said encoder and the predetermined encoding point from the identification code,
    whereby the location of the impairment is determined to be downstream of the predetermined encoding point.

11. The system of claim 10, wherein said encoder is mounted inside a network device which is electrically connected to the coaxial cable portion of the network.

12. The system of claim 11, wherein said network device is a multi-tap.

13. The apparatus system of claim 11, wherein said network device is an amplifier.

14. A method of locating an impairment in a coaxial cable portion of a hybrid fiber-coax network, comprising the steps of:
    (a) coupling an encoder to the coaxial cable portion of the network at a predetermined encoding point upstream of the impairment;
    (b) automatically encoding an identification code on a signal originating downstream of the encoding point and associated with the impairment, using the encoder;
    (c) coupling an impairment detector to the network at an access point upstream from the encoding point to receive signals from the network;
    (d) detecting from the received signals the signal associated with the impairment and creating a detected signal therefrom, using the impairment detector;
    (e) decoding the identification code of said encoder from the detected signal; and
    (f) identifying said encoder and the predetermined encoding point from the identification code,
    whereby the location of the impairment is determined to be downstream of the predetermined encoding point.

15. A method of locating an impairment in a cable network having a plurality of branches and carrying return path signals in each of the branches, the return path signals carried in one of the branches including an impairment signal associated with the impairment, said method comprising the steps of:
    (a) automatically encoding the return path signals in each of the plurality of branches with an identification code, the identification code at each branch being unique relative to the identification codes at the other branches;
    (b) receiving the encoded return path signals from the plurality of branches at a receive point in the cable network upstream from the plurality of branches;
    (c) detecting from the encoded return path signals received in step (b) the impairment signal, the impairment signal being encoded with one of the identification codes;
    (d) decoding the identification code of the impairment signal; and
    (e) identifying the branch from which the impairment signal was received based on the identification code decoded in step (d),
    whereby the location of the impairment is determined to be associated with the branch from which the impairment signal was received.

16. The method of claim 15, wherein step (a) includes amplitude modulating the return path signals in each of the plurality of branches at a modulation frequency, the modulation frequency of each branch being unique relative to the modulation frequencies of the other branches.

17. The method of claim 16, wherein the return path signals are amplitude modulated with an attenuation of about 0.2 dB.

18. The method of claim 16, wherein the return path signals are amplitude modulated with an attenuation of about 0.5 dB.

19. The method of claim 16, wherein the return path signals are amplitude modulated with an attenuation in the range of about 0.2 dB to about 2 dB.

20. The method of claim 19, wherein the return path signals are amplitude modulated within a frequency band of about 5 MHz to about 20 MHz.

21. A method of locating an impairment in a cable network containing a plurality of encoding points and carrying return path signals by each of the encoding points, the return path signals by one of the encoding points including an impairment signal associated with the impairment, said method comprising the steps of:

(a) automatically encoding the return path signals by each of the encoding points with an identification code, the identification code at each encoding point being unique relative to the identification codes at the other encoding points;

(b) receiving the encoded return path signals from the plurality of encoding points at a receive point in the cable network upstream from the plurality of encoding points;

(c) detecting from the encoded return path signals received in step (b) the impairment signal, the impairment signal being encoded with one of the identification codes;

(d) decoding the identification code of the impairment signal; and (e) identifying the encoding point from which the impairment signal was received based on the identification code decoded in step (d), whereby the location of the impairment is determined to be downstream of the encoding point from which the impairment signal was received.

* * * * *